(12) United States Patent
Isbrucker et al.

(10) Patent No.: US 11,835,383 B2
(45) Date of Patent: *Dec. 5, 2023

(54) OPTICAL SYSTEMS AND DEVICES FOR MONITORING A LIGHT SIGNAL

(71) Applicant: GOOGLE LLC, Mountain View, CA (US)

(72) Inventors: Victor Emile Isbrucker, Kitchener (CA); Daniel J. Effinger, Hamilton (CA); Joshua Moore, Elora (CA)

(73) Assignee: GOOGLE LLC, Mountain View, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/546,279

(22) Filed: Dec. 9, 2021

(65) Prior Publication Data

US 2022/0099484 A1   Mar. 31, 2022

Related U.S. Application Data

(63) Continuation of application No. 16/598,578, filed on Oct. 10, 2019, now Pat. No. 11,199,443.

(60) Provisional application No. 62/746,345, filed on Oct. 16, 2018.

(51) Int. Cl.
    *G01J 1/42*      (2006.01)
    *G02B 27/10*   (2006.01)
    *G02B 6/42*     (2006.01)
    *G02B 27/01*   (2006.01)

(52) U.S. Cl.
    CPC .......... *G01J 1/4228* (2013.01); *G02B 6/4215* (2013.01); *G02B 27/108* (2013.01); *G02B 27/0172* (2013.01); *G02B 2027/0112* (2013.01); *G02B 2027/0178* (2013.01)

(58) Field of Classification Search
    CPC ... G01J 1/4228; G02B 6/4215; G02B 27/108; G02B 27/0172; G02B 2027/0112; G02B 2027/0178
    See application file for complete search history.

(56) References Cited

U.S. PATENT DOCUMENTS 11,199,443  B2 *  12/2021   Isbrucker ............. G02B 27/108

\* cited by examiner

*Primary Examiner* — Kevin K Pyo
*Assistant Examiner* — Don J Williams

(57) ABSTRACT

There is provided an optical system comprising a light conduit. The light conduit comprises a first light pipe, a second light pipe, and a first bridge to mechanically couple the first light pipe to the second light pipe. The first light pipe has a first inlet to receive a first input light signal and a first outlet to emit at least a portion of the first input light signal to form a first output light signal. Moreover, the second light pipe has a second inlet to receive a second input light signal and a second outlet to emit at least a portion of the second input light signal to form a second output light signal. Furthermore, the first bridge has a first end mechanically coupled to the first light pipe and a second end mechanically coupled to the second light pipe.

19 Claims, 11 Drawing Sheets

OPTICAL SYSTEMS AND DEVICES FOR MONITORING A LIGHT SIGNAL

CROSS-REFERENCE TO RELATED APPLICATIONS

The present application is a continuation of U.S. patent application Ser. No. 16/598,578, entitled "OPTICAL SYSTEMS AND DEVICES FOR MONITORING A LIGHT SIGNAL", filed on Oct. 10, 2019, which claims priority to U.S. Provisional Patent Application 62/746,345, filed Oct. 16, 2018, the entirety of which is incorporated by reference herein.

FIELD

The present systems and devices relate generally to optical systems and devices for monitoring a light signal, and particularly to optical systems and devices for monitoring a light signal generated by an image projector.

BACKGROUND

Light sources generate light signals that may be used in a variety of applications ranging from telecommunications to image projection. Light sources in image projectors generate light signals such as light beams, which in turn are used to form an image on a projection surface. Image projectors may use one or multiple light sources, which may have different operating parameters such as color and intensity. When multiple light sources are used, the light signals from the light sources may be combined to form the projection light signal.

Such image projectors may be used in different applications, including but not limited to head-mounted displays. A head-mounted display is an electronic device that is worn on a user's head and, when so worn, secures at least one electronic display within a viewable field of at least one of the user's eyes, regardless of the position or orientation of the user's head. A wearable heads-up display (WHUD), in turn, is a head-mounted display that enables the user to see displayed content but also does not prevent the user from being able to see their external environment. The "display" component of a WHUD is either transparent or at a periphery of the user's field of view so that it does not completely block the user from being able to see their external environment. Examples of WHUDs include: the Google Glass®, the Optinvent Ora®, the Epson Moverio®, and the Sony Glasstron®, just to name a few.

BRIEF SUMMARY

According to an aspect of the present systems and devices, there is provided an optical system comprising a light conduit. The light conduit in turn comprises a first light pipe having a first inlet to receive a first input light signal and a first outlet to emit at least a portion of the first input light signal to form a first output light signal. The light conduit also comprises a second light pipe having a second inlet to receive a second input light signal and a second outlet to emit at least a portion of the second input light signal to form a second output light signal. Moreover, the light conduit comprises a first bridge to mechanically couple the first light pipe to the second light pipe, the first bridge having a first end mechanically coupled to the first light pipe and a second end mechanically coupled to the second light pipe.

The first light pipe may have a first optical axis extending from the first inlet to the first outlet; the second light pipe may have a second optical axis extending from the second inlet to the second outlet; and the first optical axis and the second optical axis may lie on one of: parallel respective planes; or a common plane.

The first optical axis may be at least about parallel to the second optical axis.

At least one of the first light pipe and the second light pipe may have a hexagonal cross-section.

The first light pipe may be spaced from the second light pipe.

The first light pipe may be optically isolated from the second light pipe.

One or more of: the first inlet may have a first inlet area larger than a first outlet area of the first outlet; and the second inlet may have a second inlet area larger than a second outlet area of the second outlet.

One or more of: a cross-sectional area of the first light pipe may decrease along a length of the first light pipe along a first direction extending from the first inlet towards the first outlet; and a cross-sectional area of the second light pipe may decrease along a length of the second light pipe along a second direction extending from the second inlet towards the second outlet.

The light conduit may further comprise a second bridge to mechanically couple the first light pipe to the second light pipe, the second bridge having a first end mechanically coupled to the first light pipe and a second end mechanically coupled to the second light pipe, the second bridge spaced from the first bridge.

The first light pipe, the second light pipe, the first bridge, and the second bridge may substantially define a plane.

The second bridge may comprise an extension protruding from the second bridge along the plane and away from the first bridge, the extension being spaced from the first light pipe and the second light pipe, the extension comprising a lip protruding from the extension out of the plane.

The light conduit may further comprise a side arm having a corresponding first end mechanically coupled to one of the first light pipe or the second light pipe, and a corresponding second end mechanically coupleable to a component external to the light conduit.

The side arm, the first light pipe, the second light pipe, and the first bridge may substantially define a plane, and the side arm may be coupled to a side of the one of the first light pipe or the second light pipe opposite the first bridge.

The optical system may further comprise a light splitter to divide an incoming light signal to form the first input light signal, the second input light signal, and a third light signal.

The light splitter may comprise: a first partial reflector to partially reflect the incoming light signal to form the first input light signal and to substantially transmit a remainder of the incoming light signal to form an intermediate light signal; and a second partial reflector to partially reflect the intermediate light signal to form the second input light signal, and to substantially transmit a remainder of the intermediate light signal to form the third light signal.

The third light signal may have an intensity about 20% of a corresponding intensity of the incoming light signal.

The incoming light signal may comprise red light, green light, and blue light; and the light splitter may be to divide the incoming light signal to form: the first input light signal having about 57.4% of an intensity of the red light, about 59.4% of an intensity of the green light, and about 78.8% of an intensity of the blue light; the second input light signal having about 11.8% of the intensity of the red light, about 14.0% of the intensity of the green light, and about 8.8% of the intensity of the blue light; and the third light signal having about 30.8% of the intensity of the red light, about 26.6% of the intensity of the green light, and about 12.4% of the intensity of the blue light.

The optical system may further comprise a first light detector to receive the first output light signal and a second light detector to receive the second output light signal.

The first light detector may be to detect a uniformity of the first output light signal and the second light detector may be to detect an intensity of the second output light signal.

One or more of the first light detector and the second light detector may comprise a photodiode.

The first light pipe, the second light pipe, and the first bridge may be integrally formed with one another.

The first light pipe, the second light pipe, and the first bridge may be formed as a contiguous piece of optical material.

The first light pipe, the second light pipe, the first bridge, and the second bridge may be formed as a contiguous piece of optical material.

The first light pipe, the second light pipe, the first bridge, and the side arm may be formed as a contiguous piece of optical material.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations.

However, one skilled in the relevant art will recognize that implementations may be practiced without one or more of these specific details, or with other methods, components, materials, etc. In other instances, well-known structures associated with light sources, image projectors, portable electronic devices, and head-worn devices have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Figure 1:
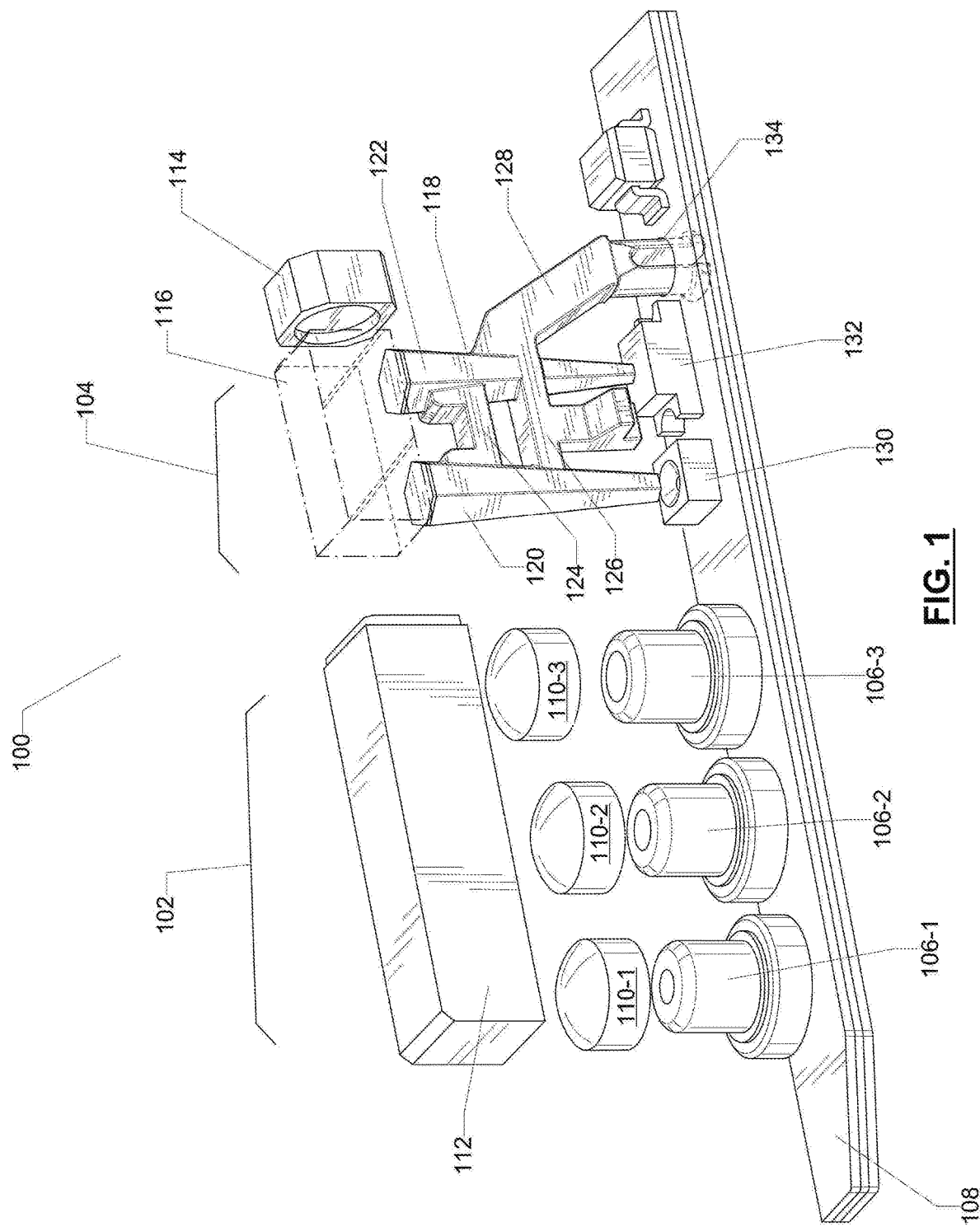
FIG. 1 shows a perspective view of an example light source module, in accordance with an implementation of the present systems and devices.

FIG. 1 shows a perspective view of an example light source module 100 comprising an example light generation module 102 and an example optical system 104 for monitoring the light signal generated by light generation module 102. Light generation module 102 comprises light sources 106-1, 106-2, and 106-3 (hereinafter collectively and/or generically referred to as light sources 106) mounted on and electrically connected to a printed circuit board (PCB) 108. Light sources 106 may comprise laser diodes of different colors, or other suitable light sources.

The light generated by light sources 106-1, 106-2, and 106-3 passes through lenses 110-1, 110-2, and 110-3 respectively, and then is received in a light combiner 112. Light combiner 112 combines the light from each of the light sources into one light signal (not shown in FIG. 1) which exits light combiner 112 and propagates towards lens 114. This light signal, and the other light signals described herein, may comprise continuous or intermittent beams of light, or other signals of electromagnetic radiation. While the following description may refer to light beams, it is contemplated that these light beams may include, or may instead on in addition be, other types of light signals.

In order to determine whether the light beam generated by light generation module 102 meets safety guidelines and image projection specifications, the light beam may be monitored by sampling the light beam and measuring the samples for characteristics such as intensity, uniformity, and the like. Optical system 104 performs these sampling and measuring functions. System 104 comprises a light splitter 116 positioned between light combiner 112 and lens 114 and in the path of the light beam generated by light generation module 102. System 104 also comprises a light conduit 118, which comprises a first light pipe 120 and a second light pipe 122 mechanically coupled together by a first bridge 124 and a second bridge 126. Light conduit 118 also comprises a side arm 128 which is used to mechanically couple light conduit 118 to PCB 108. In addition, system 104 comprises a first light detector 130 and a second light detector 132. System 104 may be used to monitor a light signal, such as the light beam emanating from light combiner 112 of light generation module 102. The operation of system 104 is described in greater detail below in relation to FIG. 4.

Figure 2:
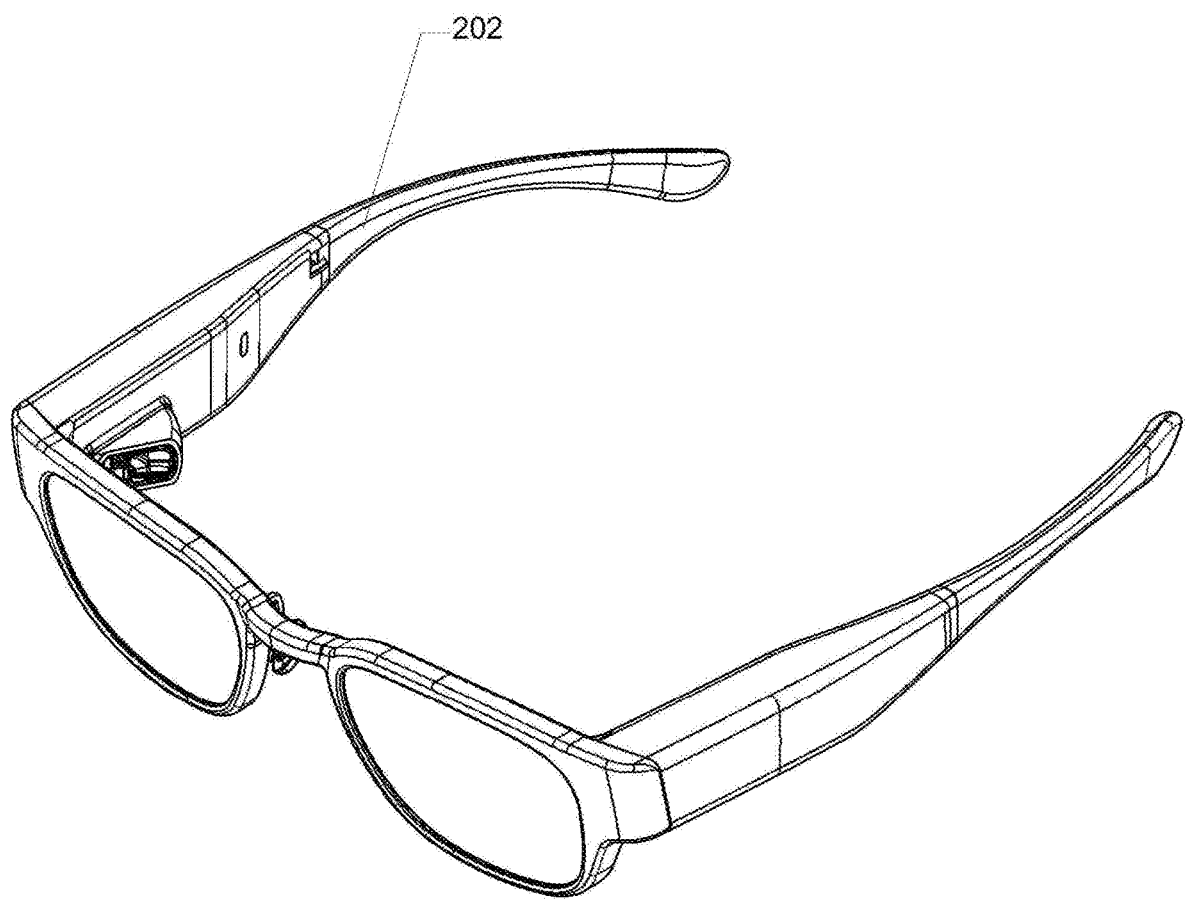
FIG. 2 shows a perspective view of an example wearable heads-up display, in accordance with an implementation of the present systems and devices.
Figure 3:
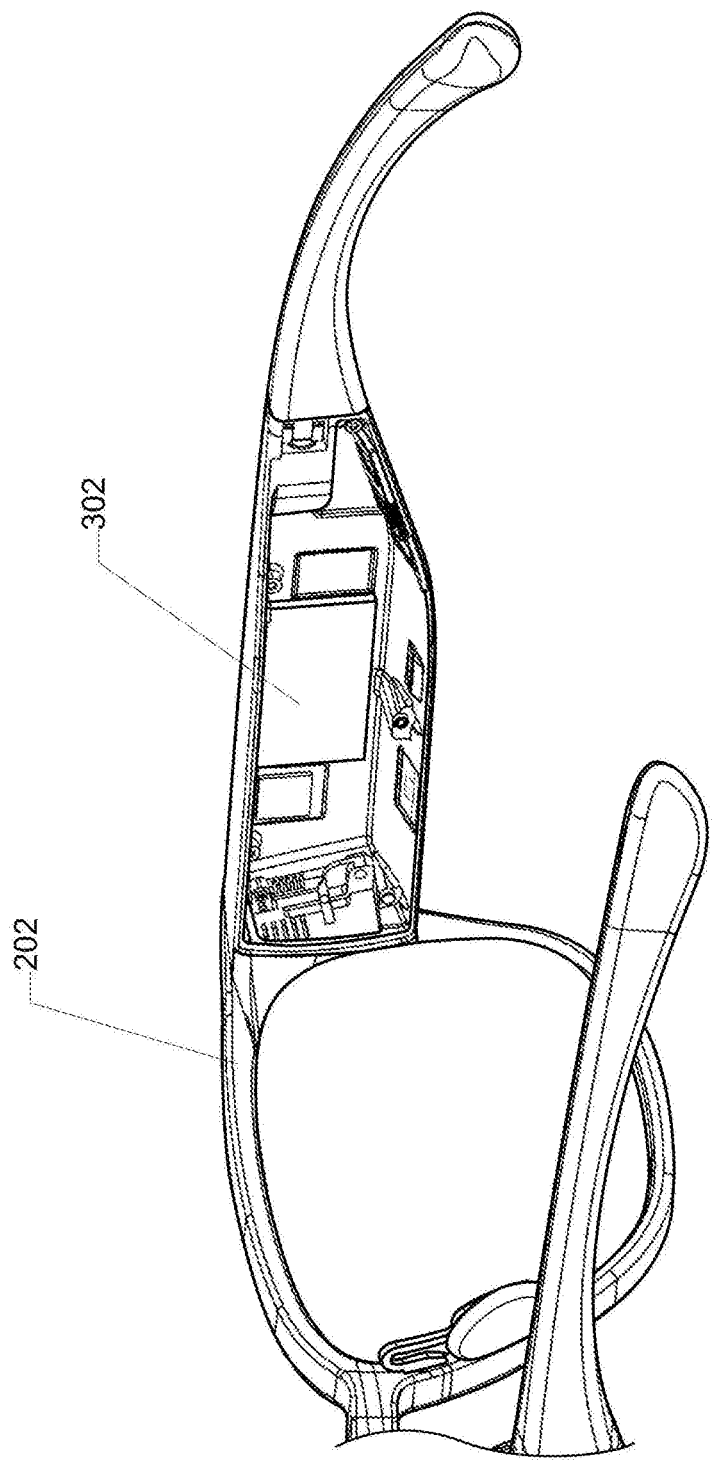
FIG. 3 shows another partial perspective view of the wearable heads-up display of FIG. 2.

FIG. 2 shows an example WHUD 202 in the form of eyeglasses. In some implementations, light source module 100 may be housed in one of the temple arms of WHUD 202. FIG. 3 shows a space 302 that may receive or house light source module 100. The light beam generated by light generation module 102 of light source module 100 may be used together with a spatial light modulator to form an image on a lens of the eyeglasses.

Figure 4:
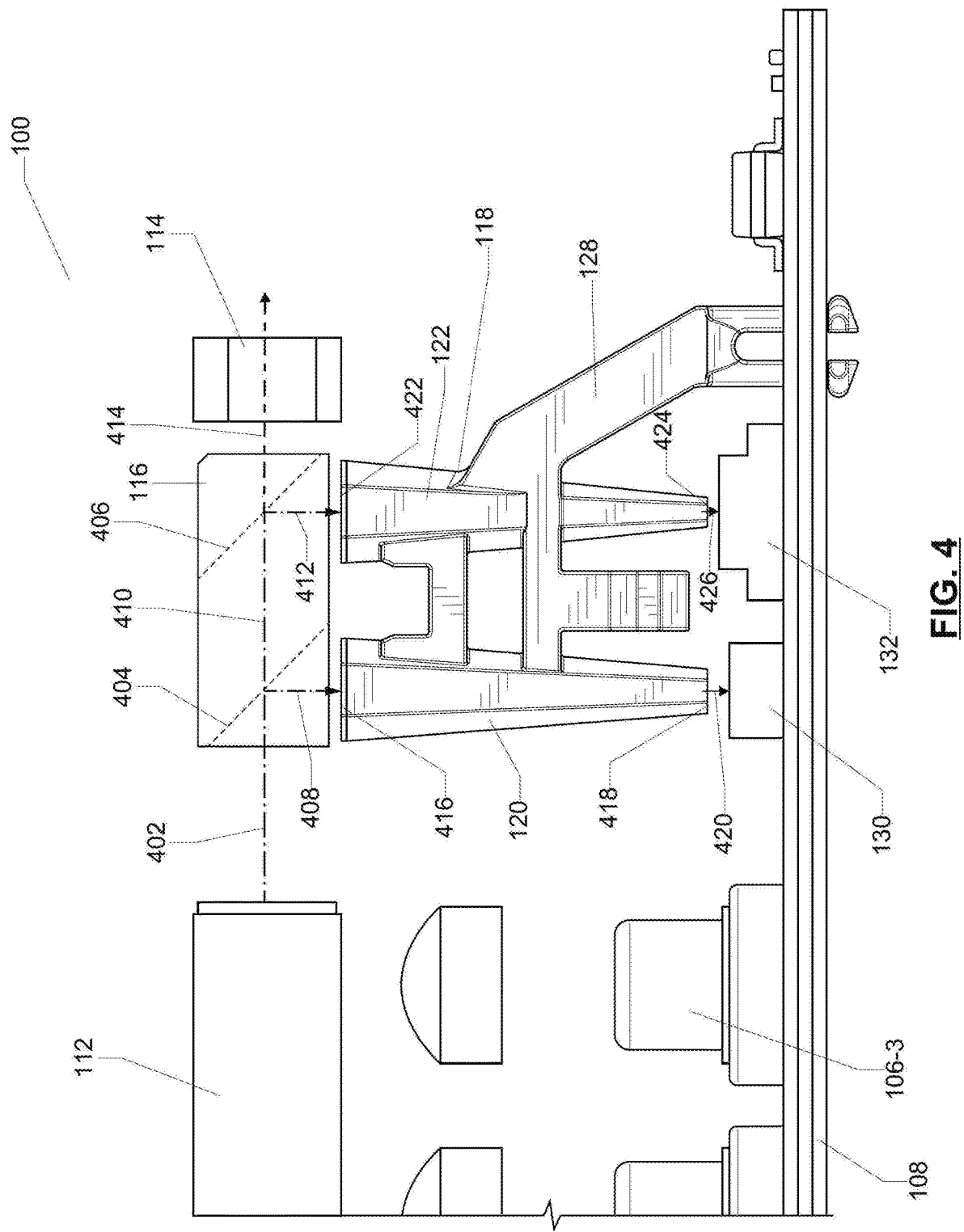
FIG. 4 shows a partial side elevation view of the light source module of FIG. 1.

Turning now to FIG. 4, a partial side elevation view is shown of light source module 100. Light combiner 112 combines the light from light sources 106 and emits a light beam 402 which passes through light splitter 116 on its way to lens 114. Light splitter 116, in turn, comprises a first partial reflector 404 and a second partial reflector 406. In some implementations, these partial reflectors may comprise dichroics, or the like.

Partial reflector 404 partially reflects the incoming light beam 402 to form a first input light beam 408 and substantially transmits a remainder of the light beam 402 to form an intermediate light beam 410. In this manner, partial reflector 404 of light splitter 116 splits light beam 402 into two light beams 408 and 410. Partial reflector 406, in turn, partially reflects intermediate light beam 410 to form a second input light beam 412 and substantially transmits a remainder of intermediate light beam 410 to form a third light beam 414. Similarly, in this manner, partial reflector 406 of light splitter 116 splits light beam 410 into two light beams 412 and 414. Light beam 414, in turn, may pass through lens 114 and be used, together with a spatial modulator, to project an image. As such, light splitter 116 splits from light beam 402 two sampling or monitoring beams in the form of input light beams 408 and 412, while allowing the remainder of light beam 402 to be transmitted as light beam 414, which may then be used to project an image.

Input light beam 408 is received through an inlet 416 of light pipe 120. Light pipe 120, in turn, emits through its outlet 418 at least a portion of input light beam 408 to form an output light beam 420. Output light beam 420 is then received and detected by light detector 130. Similarly, input light beam 412 is received through an inlet 422 of light pipe 122, which in turn emits through its outlet 424 at least a portion of input light beam 412 to form an output light beam 426. Output light beam 426 is then received and detected by light detector 132. In this manner, light pipes 120 and 122 of light conduit 118 guide input light beams 408 and 412 from light splitter 116 to light detectors 130 and 132 respectively.

In some implementations, one or both of light detectors 130 and 132 may comprise photodiodes. Moreover, in some implementations, one or more of the light detectors may each comprise multiple photodiodes, or a combination of one or more photodiodes and other types of sensors.

In addition to guiding the input light beams from the light splitter or the light detectors, light pipes 120 and 122 may further condition input light beams 408 and 412. For example, the length, cross-sectional shape, and the taper of light pipes 120 and 122 may affect light properties including beam uniformity, beam divergence upon exiting the outlet, beam intensity, and the like.

Output light beam 420 is then detected by light detector 130 to measure a uniformity of the beam. This measurement of uniformity may provide an indication of the quality of light beams 402 and 414, which in turn affects the quality of images projected using light beam 414. The types of uniformity measured may include without limitation uniformity of color or intensity across a cross-section of the light beam.

Output light beam 426, in turn, is detected by light detector 132 to measure an intensity of the beam. This measurement may act as a safety check, whereby if the intensity exceeds a threshold, the light sources 106 may be disabled to avoid exposing an eye of the user to a level of light intensity that exceeds safety standards.

In other implementations, the relative position or function of light detectors 130 and 132 may be interchanged. Moreover, in other implementations, attributes of light beams other than uniformity and intensity may be detected using detectors suitable for measuring those attributes. Measuring intensity, uniformity, and other attributes of light beams 420 and 426 may be used to monitor the light beam 402 generated by light generation module 102.

The type and operational parameters of partial reflectors 404 and 406 may affect the characteristics of light beams 408, 412, and 414. In some implementations, most of the intensity of light beam 402 may be directed towards light detectors 130 and 132, resulting in light beam 414 having an intensity about 20% of the intensity of light beam 402.

Moreover, in some implementations, light generation module 102 may comprise light sources 106 that emit red, green, and blue light which are then combined together in light combiner 112. In some of these implementations, partial reflector 404 may have reflective and transmissive properties that cause light beam 408 to have about 57.4% of the intensity of the red light, about 59.4% of the intensity of the green light, and about 78.8% of the intensity of the blue light, all expressed relative to the intensities of red, green, and blue lights in light beam 402. Furthermore, partial reflectors 404 and 406 may have reflective and transmissive properties that cause light beam 412 to have about 11.8% of the intensity of the red light, about 14.0% of the intensity of the green light, and about 8.8% of the intensity of the blue light, and light beam 414 to have about 30.8% of the intensity of the red light, about 26.6% of the intensity of the green light, and about 12.4% of the intensity of the blue light, all expressed relative to the intensities of red, green, and blue lights in light beam 402. The specific manner in which light beam 402 is split by light splitter 116 into light beams 408, 412, and 414 may be selected based on the operational parameters of light detectors 130 and 132, and based on the characteristics of light beam 414 that would produce a projected image that meets image quality specifications.

In FIG. 4, two light detectors 130 and 132 are used to measure two different attributes of light beam 402. In order to sample light beam 402 for light detectors 130 and 132 to measure, light splitter 116 splits two light beams 408 and 412 from light beam 402, and light pipes 120 and 122 guide light beams 408 and 412 to light detectors 130 and 132. In other implementations, there may be three or more light detectors, which would in turn receive three or more light beams guided towards them by three or more light pipes. When assembling light source module 100, each of these multiple light pipes would need to be assembled and aligned individually, to allow its output light beam to reach the corresponding light detector. Such an individual assembly and aligning of light pipes is time-consuming and prone to misalignment errors.

In order to simplify assembling and alignment of light pipes 120 and 122, the two light pipes are connected together to form light conduit 118, which may be assembled and aligned as one piece. In addition, light conduit 118 comprises side arm 128 which may allow conduit 118 to connect to and align itself relative to components such as PCB 108, which are external to light conduit 118.

Figure 5:
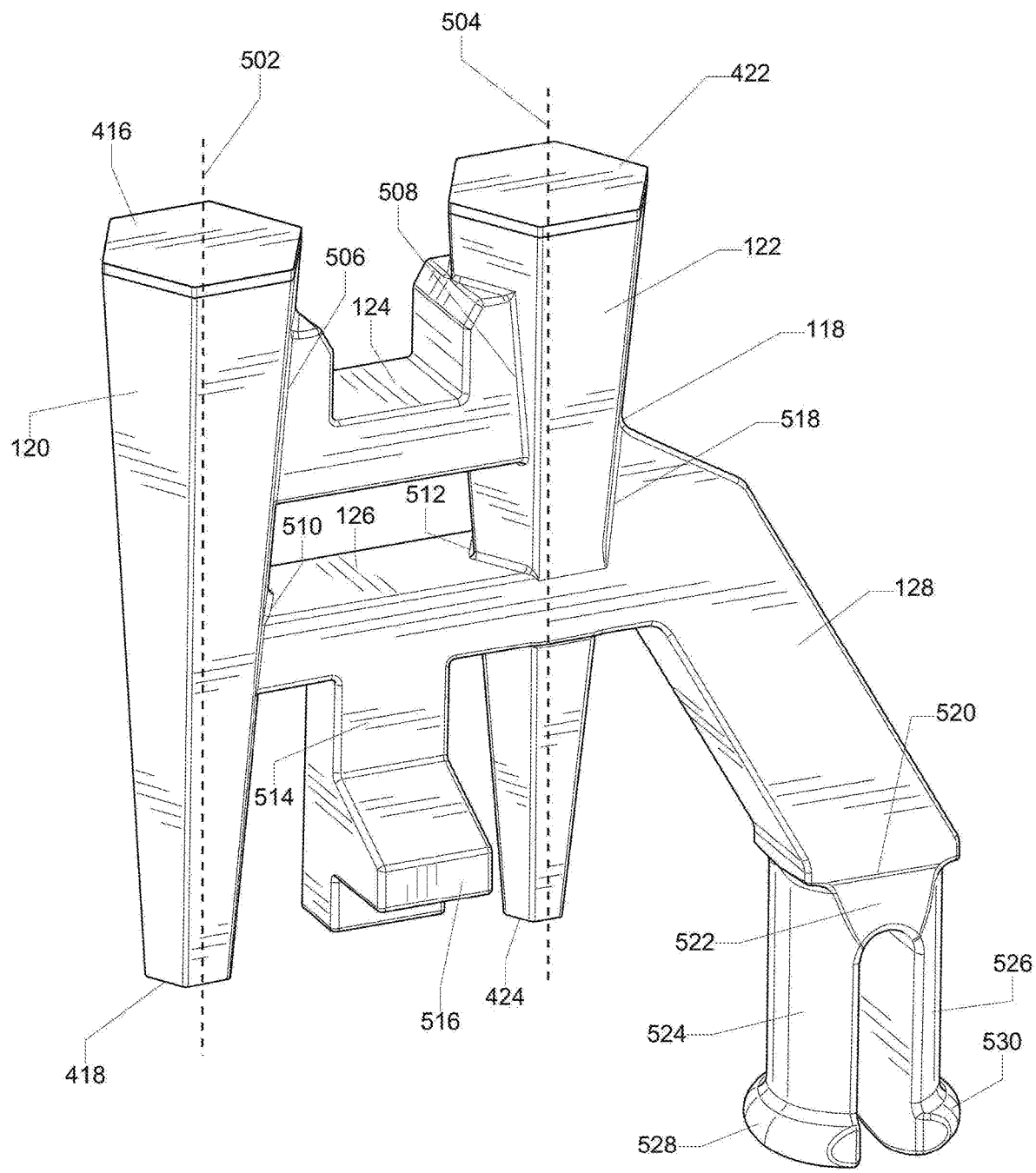
FIG. 5 shows a top perspective view of an example light conduit from a first side, in accordance with an implementation of the present systems and devices.

FIG. 5 shows a top perspective view of light conduit 118, which comprises the first light pipe 120 and the second light pipe 122. First light pipe 120 has inlet 416 to receive input light and outlet 418 to emit output light. The output light may comprise all or a portion of the input light, as modified by light pipe 120. Light pipe 120 may guide light using total internal reflection, or other suitable mechanisms. The cross-sectional shape, length, and taper of light pipe 120 may affect how and to what extend light pipe 120 modifies the input light. For example, a longer light pipe may allow for a larger number of total internal reflections, which may in turn cause the output light to be more uniform. Other characteristics of light pipe 120 may also affect how light pipe 120 changes the input light to produce the output light.

Light pipe 122 similarly has inlet 422 to receive input light and outlet 424 to emit output light. The output light may comprise all or a portion of the input light, as modified by light pipe 122. Light pipe 122 may function in a manner similar to light pipe 120. Light pipes 120 and 122 may be made of suitable optical-grade material such as Zeonex™ E48R optical resin, and the like.

FIG. 5 shows both light pipes 120 and 122 as having a hexagonal cross-section. It is contemplated that in other implementations the light pipes may have cross-sections of different shapes, and that the cross-sectional shape of one light pipe may be the same as or different from the cross-sectional shape of the other light pipe.

Moreover, the cross-sectional area of the inlet and outlet of the light pipes may be the similar to or different from one another. For example, in FIG. 5 the area of inlets 416 and 422 are shown to be similar or substantially the same, while the area of outlet 418 is shown to be larger than the area of outlet 424. The cross-sectional areas of the inlet and the outlet may also be referred to as inlet area and outlet area respectively. Similarly, the length of the light pipes may be similar to or different from one another. In FIG. 5, the lengths of light pipes 120 and 122 are shown to be substantially the same.

Furthermore, as shown in FIG. 5, the light pipes 120 and 122 may be tapered whereby the area of the inlet is larger than the area of the outlet. The taper may be gradual or continuous, whereby the cross-sectional area of the light pipe decreases gradually or continuously along a length of the light pipe along the direction extending from the inlet to the outlet. It is contemplated that in other implementations one or more of the light pipes need not be tapered or may have a negative taper. Moreover, where there is taper, the taper need not be continuous; for example, the taper may be stepped, or the light pipe may have a mix of portions of positive, negative, and zero taper along its length. In addition, the two light pipes may have tapers that are substantially the same or different from one another. For example, in FIG. 5 the two light pipes have a different taper, whereby light pipe 120 is less tapered (i.e. there is a smaller change in the area between the inlet and the outlet per unit length of the light pipe) than light pipe 122.

Light pipes 120 and 122 have optical axes 502 and 504 respectively. The optical axis may reflect the general or average path along which the light pipe guides light. For light pipes 120 and 122, the optical axes 502 and 504 are straight or substantially straight lines. The direction of the optical axis may be selected or designed based on the relative position of the light splitter, i.e. the origin of the input light beams, and the light detectors, i.e. the destination of the output light beams. In the implementations shown in FIGS. 1-11, the relative position of the light splitter and the light detectors is such that optical axes 502 and 504 lie on a common plane or are parallel or substantially parallel to one another.

In some implementations, the optical axes may lie on parallel respective planes. In yet other implementations, the optical axes need not be parallel to one another or lie on parallel planes. Moreover, in yet other implementations the optical axes need not be straight lines and may be curved or bent, for example in cases where the light beam is not to follow on average a straight path between the light splitter and the light detectors.

In order to mechanically couple light pipes 120 and 122 together to allow them to be assembled and aligned together as one piece, light conduit 118 comprises first bridge 124. Bridge 124 comprises a first end 506 mechanically coupled to light pipe 120 and a second end 508 mechanically coupled to light pipe 122. In FIG. 5, the light pipes and bridge 124 are coupled together by forming them integrally with one another. In other words, the light pipes and bridge 124 form a contiguous piece of optical material. In other implementations, bridge 124 may be coupled to the light pipes using adhesives or other suitable mechanical couplers.

In order to keep the light signals, such as light beams, in each light pipe separate from the light signal in the other light pipe, the two light pipes are optically isolated from one another. In cases where the light pipes and bridge 124 are integrally formed from an optical grade material, the geometry of the light pipes may promote total internal reflection of the light signals within the respective light pipes, thereby reducing the likelihood of light leaking from one light pipe, through bridge 124, into the other light pipe. In other implementations, opaque or otherwise non-light-transmissive materials may be disposed between each light pipe and bridge 124 to reduce the likelihood of light leaking from one light pipe, through bridge 124, to another light pipe. In yet other implementations, bridge 124 may comprise non-light-transmissive materials to hinder to stop light leaked from one of the light pipes into bridge 124 from reaching the other light pipe.

In FIG. 5, light pipes 120 and 122 are spaced from one another, with an airgap between the two light pipes where the two are not connected together by the first bridge 124 or the second bridge 126. In other implementations the gap between the two light pipes may be filled with a different material, such as a non-light-transmissive material. In yet other implementations, the two light pipes may be connected directly to one another along all or a portion of their length, in which case the geometry of the light pipes may promote total internal reflection within each light pipe and reduce the likelihood of light leaks from one of the light pipes into the other light pipe.

As shown in FIG. 5, light conduit 118 also comprises second bridge 126 mechanically coupling light pipe 120 to light pipe 122. Bridge 126 comprises a first end 510 mechanically coupled to light pipe 120 and a second end 512 mechanically coupled to light pipe 122. The materials comprising bridge 126 and the manner in which ends 510 and 512 are coupled to light pipes 120 and 122 may be similar to those described above in relation to bridge 124. In some implementations, the two light pipes, bridge 124, and bridge 126 may be formed integrally with one another, for example as a contiguous piece of optical material.

Second bridge 126 may be spaced from first bridge 124. This geometry may enhance the ability of the bridge 126 to increase the mechanical stiffness of light conduit 118. This increased stiffness may, in turn, reduce the likelihood of light pipes 120 and 122 losing their optical alignment due to deformation of light conduit 118.

Moreover, as shown in FIG. 5, light pipes 120 and 122 and bridges 124 and 126 may substantially define or lie on a plane. This plane may also be referred to as the plane of light conduit 118. This geometry may be dictated by the relative positions of the beam splitter and the light detectors in system 104, shown in FIG. 1.

It is contemplated that in other implementations the light pipes and the two bridges may have a geometry other than a geometry that substantially defines a plane. Moreover, it is contemplated that in some implementations the light conduit need not comprise second bridge 126.

Referring back to light conduit 118 as shown in FIG. 5, second bridge 126 comprises an extension 514 protruding from second bridge 126 along the plane of light conduit 118. Extension 514 extends away from first bridge 124 and is spaced from first light pipe 120 and second light pipe 122. Extension 514 comprises a lip 516 protruding from extension 514 and out of the plane of light conduit 118. Extension 514 and lip 516 may be formed integrally with second bridge 126, which in turn may be formed integrally with light pipes 120 and 122. In other implementations, one or more of the lips, the extension, and the second bridge may be formed separately and then mechanically coupled to one another or to the light pipes. This mechanical coupling may be achieved using adhesives, fasteners, and the like.

Moreover, it is contemplated that in other implementations the extension and the lip may have a shape or orientation different than those shown in FIG. 5, or that the extension may extend from bridge 124 instead of extending from bridge 126. Furthermore, in some implementations bridge 126 of light conduit 118 need not comprise extension 514, or bridge 126 may comprise an extension that does not have a lip.

Light conduit 118 also comprises side arm 128, which has a first end 518 mechanically coupled to light pipe 122 and a second end 520 mechanically coupleable to a component external to the light conduit, such as PCB 108 (shown in FIG. 1). In light conduit 118 shown in FIG. 5, side arm 128 also lies on the plane of light conduit 118, is coupled to light pipe 122 at about midway along the length of the light pipe, and extends away from light pipe 120. In addition to extending away from light pipe 122, side arm 128 extends in a direction generally away from inlet 422. In other implementations, the side arm may be coupled instead to light pipe 120, may extend out of the plane of light conduit 118, or may extend in a direction other than the direction shown in FIG. 5.

Side arm 128 may be integrally formed with the light pipe to which it is attached. For example, the side arm and the light pipe to which the side arm is attached may be formed as a contiguous piece of optical material. Moreover, in some implementations the two light pipes, first bridge 124, and side arm 128 may be formed as a contiguous piece of optical material. In other implementations, the side arm may be attached to a light pipe using adhesives or other mechanical couplers.

While FIG. 5 shows side arm 128 mechanically coupled to light pipe 122, it is contemplated that in other implementations end 518 of side arm 128 may be coupled to a portion of the light conduit other than the light pipes. For example, end 518 of side arm 128 may be coupled to or extend from first bridge 124, second bridge 126, extension 514, or the like.

Moreover, side arm 128 comprises a mechanical coupler 522 at its end 520. Mechanical coupler 522 comprises two tines 524 and 526 extending from end 520 in a direction away from inlets 416,422. These tines are spaced from one another, and resiliently deformable towards one another by an external compression force pushing the two tines together. Tine 524 comprises a rib 528 extending from its end laterally away from tine 526. Likewise, tine 526 comprise a rib 530 extending from its end laterally away from tine 524.

When tines 524 and 526 are compressed together, ribs 528 and 530 become closer to one another, thereby allowing mechanical coupler 522 to pass through an opening, such as opening 134 (shown in FIG. 1) in PCB 108. When the compressive force is removed, the two tines substantially return to their original orientation under their resilient force, which in turn pushes ribs 528 and 530 away from one another. In this substantially undeformed position, ribs 528 and 530 may no longer pass through opening 134, thereby mechanically coupling and securing the side arm to the PCB. It is contemplated that in other implementations, side arm 128 may comprise a mechanical coupler having a different structure or mode of operation than the ribbed tines shown in FIG. 5.

While FIG. 5 shows light conduit 118 as having one side arm 128, it is contemplated that in some implementations the light conduit need not have a side arm, or may have more than one side arm. Moreover, it is contemplated that in some implementations the light conduit may have more than two light pipes mechanically coupled together using bridges or other mechanical couplers.

Figure 6:
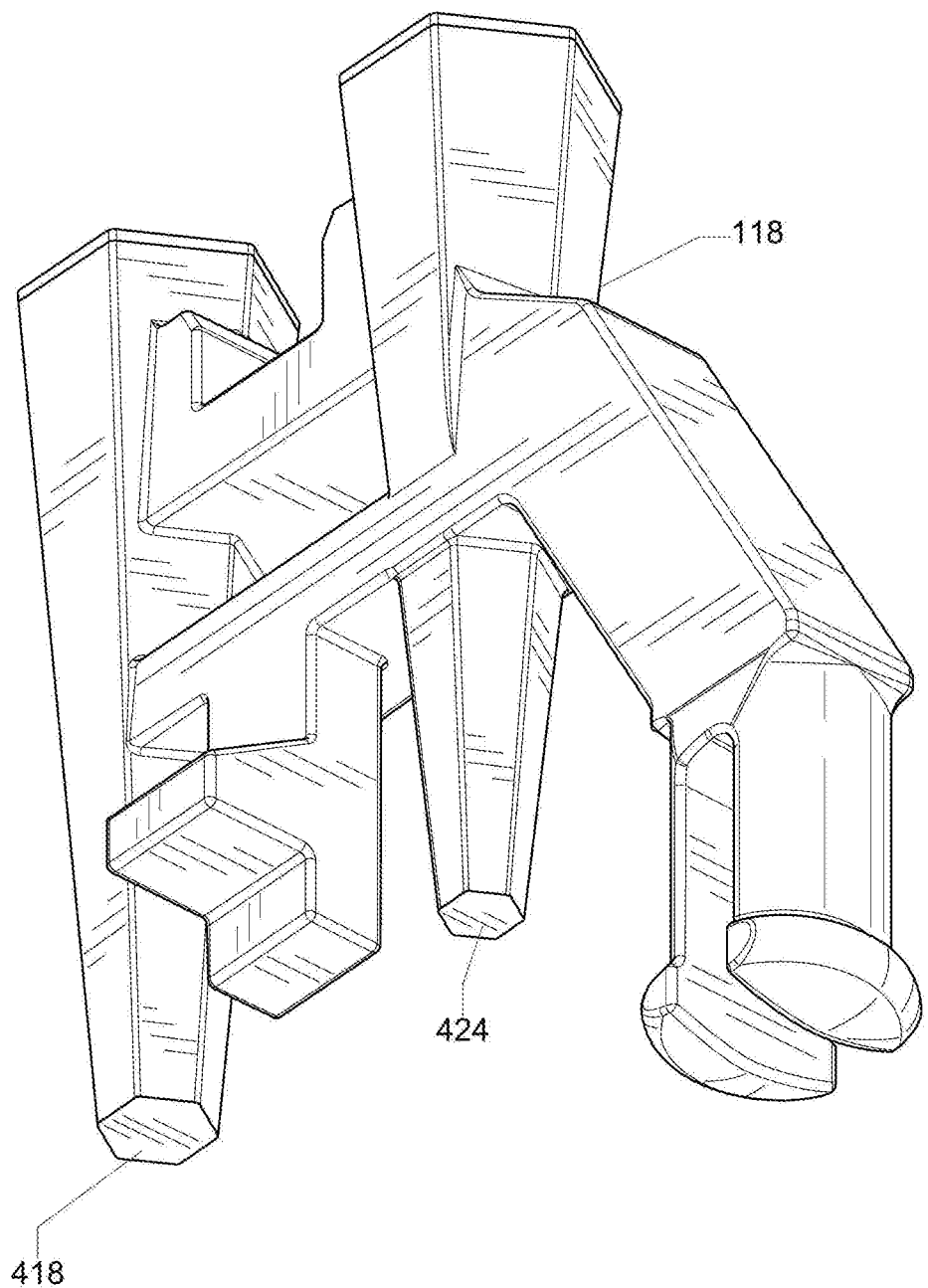
FIG. 6 shows a bottom perspective view of the light conduit of FIG. 5 from the first side.
Figure 7:
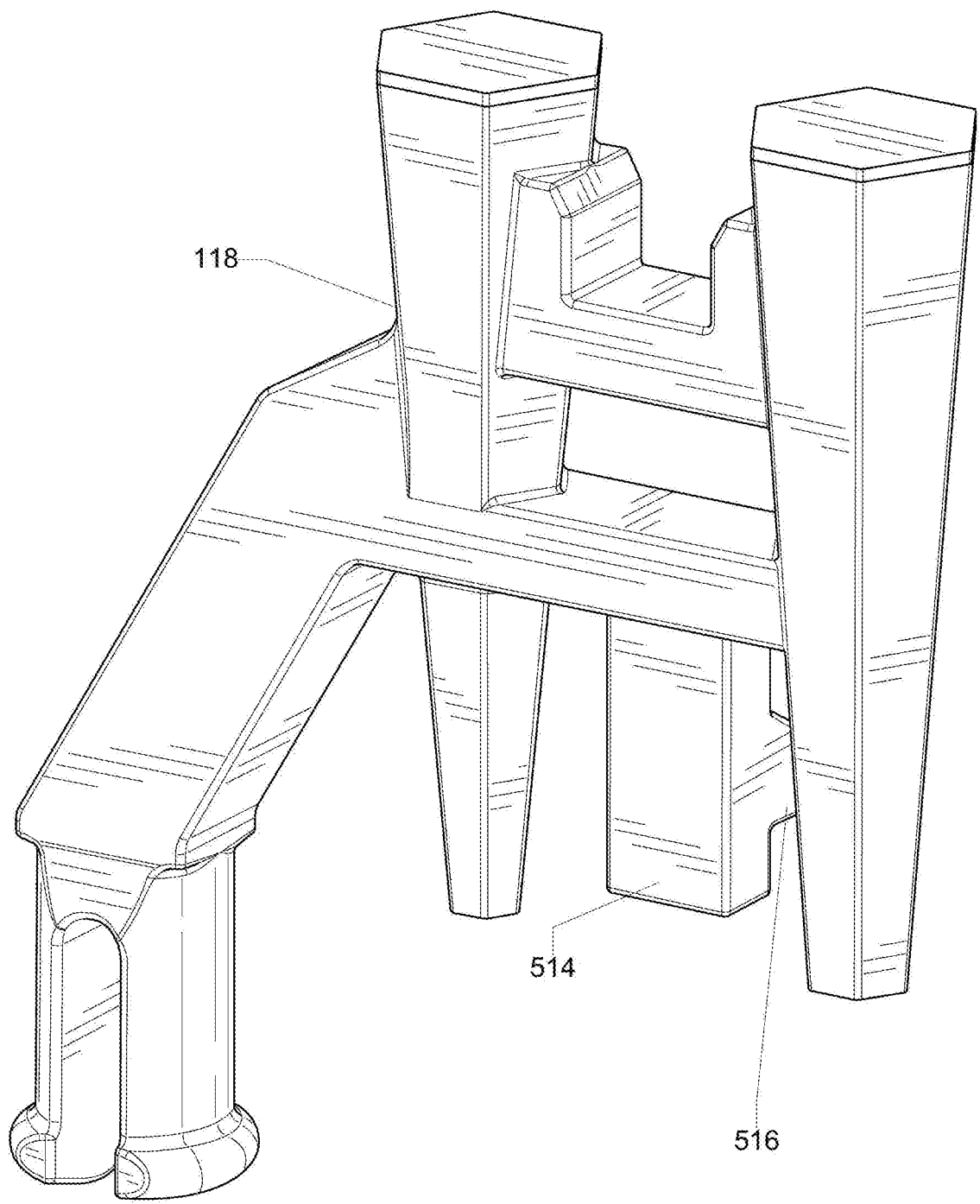
FIG. 7 shows a top perspective view of the light conduit of FIG. 5 from a second side opposite the first side.

Turning now to FIG. 6, a bottom perspective view of light conduit 118 is shown. FIG. 6 shows that the area of outlet 418 is larger than the area of outlet 424. FIG. 7 in turn shows a top perspective view of light conduit 118 from a second side opposite the first side depicted in FIGS. 5 and 6. While lip 516 protrudes from extension 514 on the first side shown in FIGS. 5 and 6, no lip protrudes from extension 514 on the second side of light conduit 118 as shown in FIG. 7.

Figure 8:
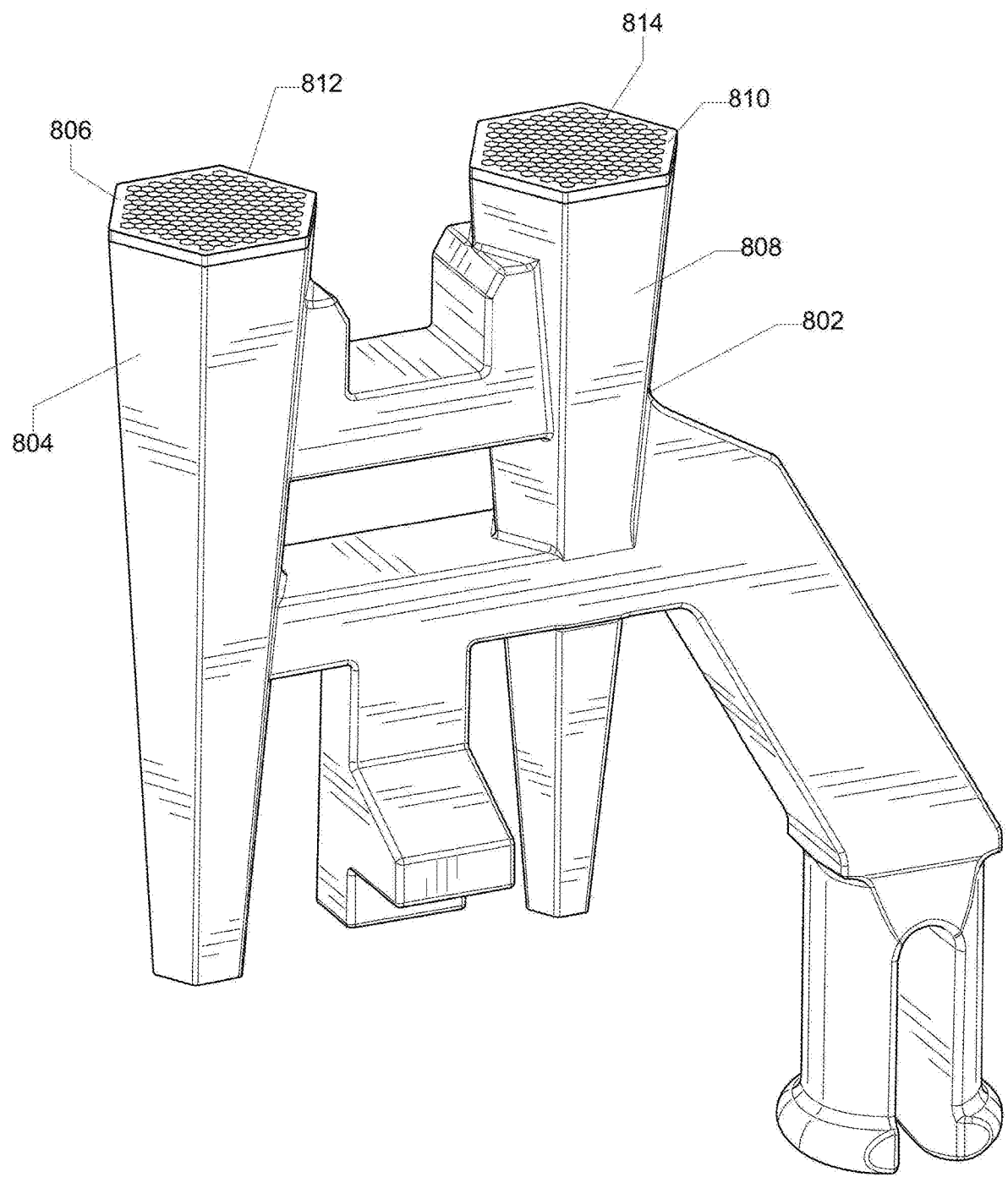
FIG. 8 shows a top perspective view of another example light conduit, in accordance with an implementation of the present systems and devices.

FIG. 8 shows a top perspective view of an example light conduit 802, which comprises a first light pipe 804 having an inlet 806 and a second light pipe 808 having a corresponding inlet 810. The structure and function of light conduit 802 may be similar to the structure and function of light conduit 118. The difference between light conduit 802 and light conduit 118 is that in light conduit 802 light pipe 804 comprises lenslets 812 at its inlet 806, and similarly light pipe 808 comprises lenslets 814 at its inlet 810. These lenslets may be integrally formed with light pipes 804 and 808, or the lenslets may be fabricated separately and then mechanically coupled to inlets 806 and 810 using an optical grade adhesive.

In some implementations, one of the light pipes may have lenslets at its inlet, and the second light pipe need not have lenslets. Moreover, in some implementations, one or more of light pipes 804 and 808 may have lenslets at their outlets.

Figure 9:
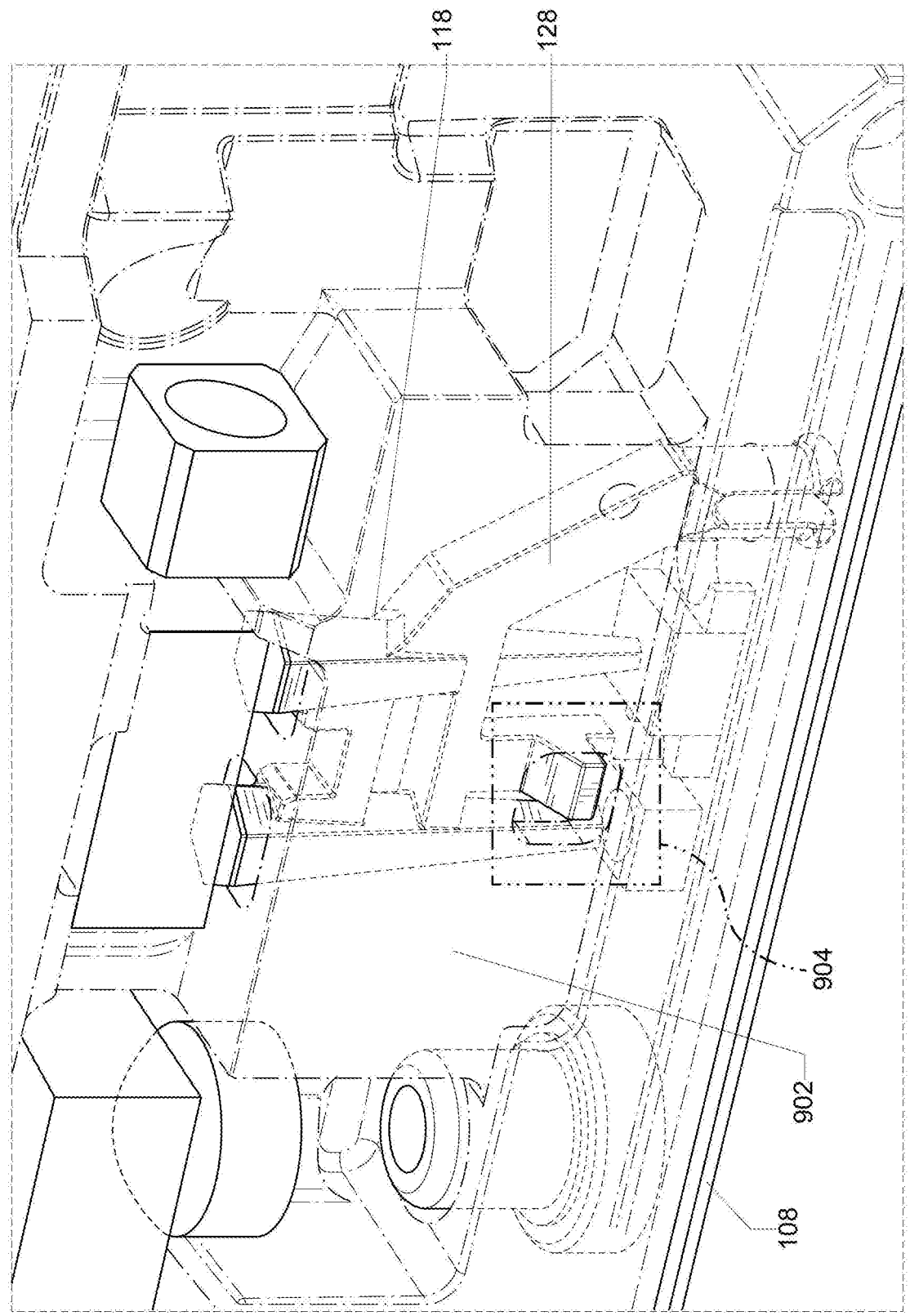
FIG. 9 shows a partial top perspective view of the light conduit of FIG. 5 within an example chassis, in accordance with an implementation of the present systems and devices.

Turning now to FIG. 9, a partial top perspective view is shown of light conduit 118 within a chassis 902, which is itself to be received or housed in space 302 (shown in FIG. 3). Chassis 902 may comprise structures and components that help to support or position light conduit 118 and the other components of light source module 100 (shown in FIG. 1) in space 302 of WHUD 202. In some implementations, chassis 902 may be adjacent to, abut against, or be mechanically coupled to PCB 108. Components of chassis 902 are shown in dashed-and-dotted lines in FIG. 9.

Figure 10:
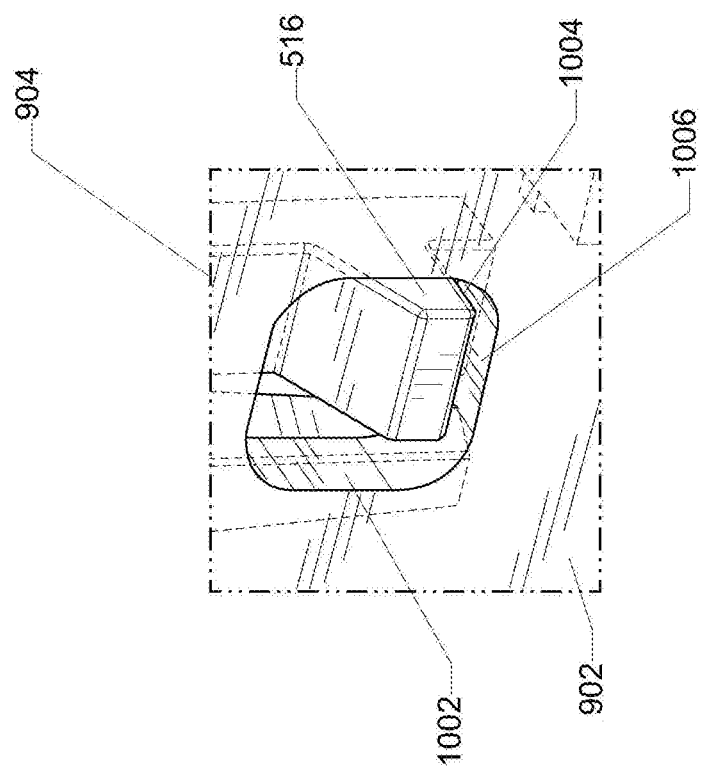
FIG. 10 shows a magnified portion of the light conduit and chassis shown in FIG. 9.

Area 904 of FIG. 9 is shown in higher magnification is FIG. 10. FIG. 10 shows that chassis 902 comprises opening 1002 to receive lip 516. When light conduit 118 and chassis 902 are assembled together, lip 516 protrudes into opening 1002, and side 1004 of lip 516 abuts against edge 1006 of opening 1002. FIG. 10 shows side 1004 and edge 1006 spaced from one another for ease of illustration; in practice, side 1004 and edge 1006 may touch or abut against one another.

Referring to both FIGS. 9 and 10, side arm 128 connecting to PCB 108 combined with lip 516 interfacing with opening 1002 may help to maintain the position and alignment of light conduit 118 within light source module 100 (shown in FIG. 1) and chassis 902.

Figure 11:
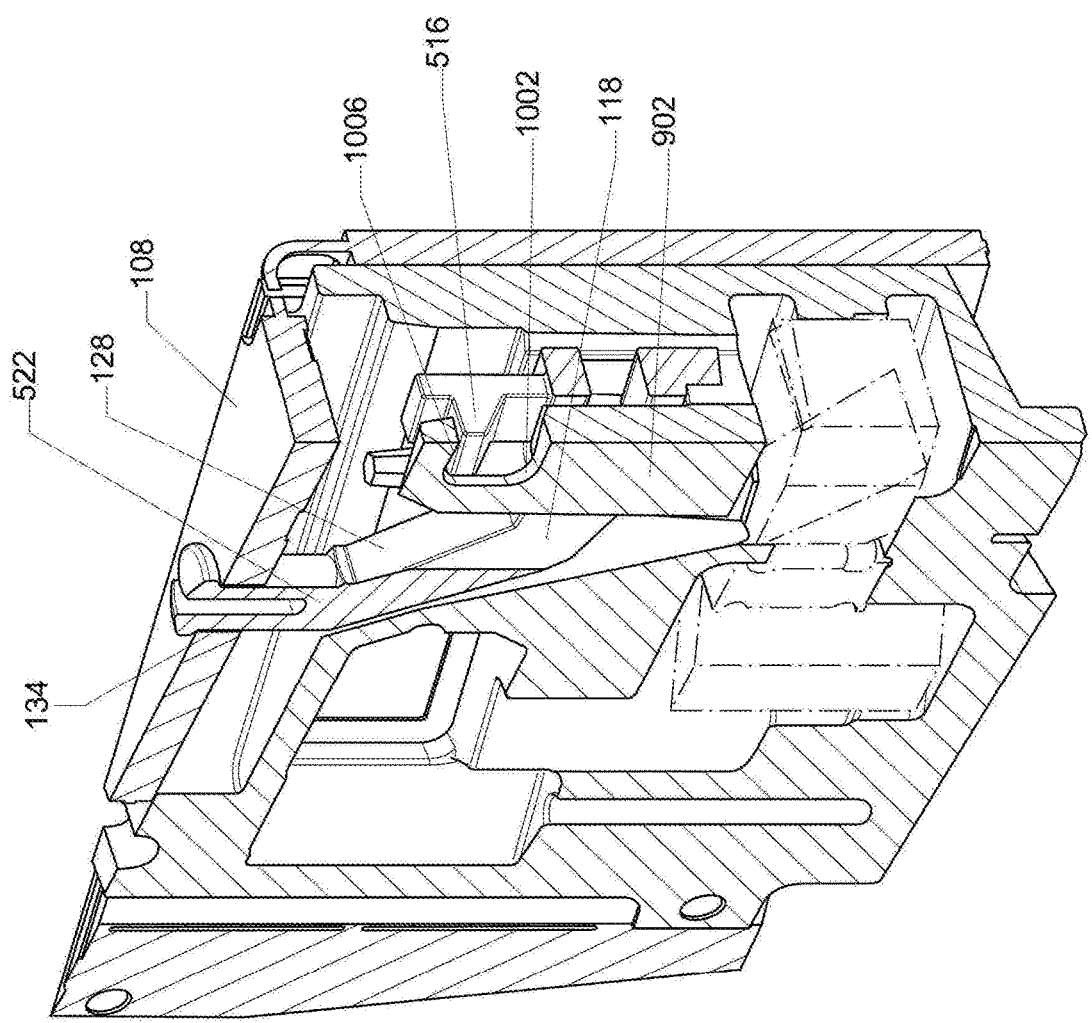
FIG. 11 shows a bottom, perspective, partial-cutaway view of the light conduit of FIG. 5 received in the chassis of FIG. 9.

FIG. 11 shows a bottom, perspective, partial-cutaway view of light conduit 118 received in chassis 902 and mechanically coupled to PCB 108. FIG. 11 shows lip 516 abutting against edge 1006 of opening 1002 in chassis 902. In addition, FIG. 11 also shows mechanical coupler 522 of side arm 128 coupled to opening 134 of PCB 108.

The optical systems described herein may comprise the optical conduits described herein, which optical conduits may simplify the assembly and alignment of multiple light pipes by allowing them to be assembled, aligned, and secured in position as one piece. In addition, the light conduits mechanically couple with or interface with the components external to the light conduit. For example, the side arm of the conduit may mechanically couple with the PCB and the lip of the light conduit may mechanically interface with an opening in the chassis. These mechanical couplings or interfaces may facilitate positioning and aligning the light conduit relative to the components adjacent to the light conduit. Moreover, once the light conduit has been aligned, these mechanical couplings and interfaces may also allow the light conduit to be secured in position and to the components adjacent to the light conduit.

In some implementations, the optical systems may also comprise one or more of the light splitter and the light detectors in addition to the light conduit. In other implementations, the optical system may comprise a light conduit and need not comprise the light splitter or the light detectors. In optical systems that comprise the light conduit but not the light splitter or the light detectors, the light splitter and the light detectors may comprise separate components or systems that then cooperate with the light conduit to sample and measure a light signal such as a light beam.

The optical systems described herein, including those systems that include light conduits and those systems that include a combination of a light conduit, light splitter, and light detectors, may be used in a variety of applications including heads-up displays such as WHUDs, other types of image projectors, and other systems or devices that generate or use a light signal.

Moreover, throughout this specification and the appended claims, infinitive verb forms are often used. Examples include, without limitation: "to receive," "to emit," "to generate," "to mechanically couple," and the like. Unless the specific context requires otherwise, such infinitive verb forms are used in an open, inclusive sense, that is as "to, at least, receive," to, at least, emit," "to, at least, generate," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An optical system comprising:
    a light conduit comprising:
        a first light pipe having a first inlet to receive a first input light signal and a first outlet to emit at least a portion of the first input light signal to form a first output light signal;
        a second light pipe having a second inlet to receive a second input light signal and a second outlet to emit at least a portion of the second input light signal to form a second output light signal;
        a first bridge to mechanically couple the first light pipe to the second light pipe, the first bridge having a first end mechanically coupled to the first light pipe and a second end mechanically coupled to the second light pipe; and
        a side arm mechanically coupled to the second light pipe, the side arm mechanically coupling the second light pipe to a substrate.

2. The optical system of claim 1, wherein:
    the first light pipe has a first optical axis extending from the first inlet to the first outlet;
    the second light pipe has a second optical axis extending from the second inlet to the second outlet; and
    the first optical axis and the second optical axis lie on one of:
        parallel respective planes; or
        a common plane.

3. The optical system of claim 2, wherein the first optical axis is at least about parallel to the second optical axis.

4. The optical system of claim 1, wherein at least one of the first light pipe and the second light pipe has a hexagonal cross-section.

5. The optical system of claim 1, wherein one or more of:
    the first inlet has a first inlet area larger than a first outlet area of the first outlet; and
    the second inlet has a second inlet area larger than a second outlet area of the second outlet.

6. The optical system of claim 5, wherein one or more of:
    a cross-sectional area of the first light pipe decreases along a length of the first light pipe along a first direction extending from the first inlet towards the first outlet; and
    a cross-sectional area of the second light pipe decreases along a length of the second light pipe along a second direction extending from the second inlet towards the second outlet.

7. The optical system of claim 1, wherein the light conduit further comprises a second bridge to mechanically couple the first light pipe to the second light pipe, the second bridge having a first end mechanically coupled to the first light pipe and a second end mechanically coupled to the second light pipe, the second bridge spaced from the first bridge.

8. The optical system of claim 7, wherein the first light pipe, the second light pipe, the first bridge, and the second bridge substantially define a plane.

9. The optical system of claim 8, wherein the second bridge comprises an extension protruding from the second bridge along the plane and away from the first bridge, the extension being spaced from the first light pipe and the second light pipe, the extension comprising a lip protruding from the extension out of the plane.

10. The optical system of claim 1 wherein the side arm, the first light pipe, the second light pipe, and the first bridge substantially define a plane, and the side arm is coupled to a side of the one of the first light pipe opposite the first bridge.

11. The optical system of claim 1, further comprising a light splitter to divide an incoming light signal to form the first input light signal, the second input light signal, and a third light signal.

12. The optical system of claim 11, wherein the light splitter comprises:
   a first partial reflector to partially reflect the incoming light signal to form the first input light signal and to substantially transmit a remainder of the incoming light signal to form an intermediate light signal; and
   a second partial reflector to partially reflect the intermediate light signal to form the second input light signal, and to substantially transmit a remainder of the intermediate light signal to form the third light signal.

13. The optical system of claim 11, wherein:
   the incoming light signal comprises red light, green light, and blue light; and
   the light splitter is to divide the incoming light signal to form:
      the first input light signal having about 57.4% of an intensity of the red light, about 59.4% of an intensity of the green light, and about 78.8% of an intensity of the blue light;
      the second input light signal having about 11.8% of the intensity of the red light, about 14.0% of the intensity of the green light, and about 8.8% of the intensity of the blue light; and
      the third light signal having about 30.8% of the intensity of the red light, about 7.6% of the intensity of the green light, and about 12.4% of the intensity of the blue light.

14. The optical system of claim 11, further comprising a first light detector to receive the first output light signal and a second light detector to receive the second output light signal.

15. The optical system of claim 14, wherein the first light detector is to detect a uniformity of the first output light signal and the second light detector is to detect an intensity of the second output light signal.

16. The optical system of claim 14, wherein one or more of the first light detector and the second light detector comprise a photodiode.

17. The optical system of claim 1, wherein the first light pipe, the second light pipe, and the first bridge are integrally formed with one another.

18. The optical system of claim 1, wherein the first light pipe, the second light pipe, and the first bridge are formed as a contiguous piece of optical material.

19. An optical system comprising:
   a light conduit comprising:
   a first light pipe having a first inlet to receive a first input light signal and a first outlet to emit at least a portion of the first input light signal to form a first output light signal;
      a second light pipe having a second inlet to receive a second input light signal and a second outlet to emit at least a portion of the second input light signal to form a second output light signal; and
      a first bridge to mechanically couple the first light pipe to the second light pipe, the first bridge having a first end mechanically coupled to the first light pipe and a second end mechanically coupled to the second light pipe; and
   a light splitter to divide an incoming light signal to form at least the first input light signal, and the second input light signal and the light splitter is to divide the incoming light signal to form:
      the first input light signal having a first set of red, green, and blue light intensities; and
      the second input light signal having a second set of red, green, and blue light intensities that is different from the first set of red, green, and blue light intensities.

* * * * *

UNITED STATES PATENT AND TRADEMARK OFFICE
CERTIFICATE OF CORRECTION

PATENT NO.         : 11,835,383 B2
APPLICATION NO.    : 17/546279
DATED              : December 5, 2023
INVENTOR(S)        : Victor Emile Isbrucker It is certified that error appears in the above-identified patent and that said Letters Patent is hereby corrected as shown below:

In the Claims

Column 13 Line 34, Claim 13 delete "7.6%" and insert --26.6%--

Column 14 Line 33, Claim 19 delete "light signal" and insert --light signal,--

Signed and Sealed this
Nineteenth Day of March, 2024

Katherine Kelly Vidal
*Director of the United States Patent and Trademark Office*